United States Patent
Chen et al.

(10) Patent No.: US 8,649,190 B2
(45) Date of Patent: Feb. 11, 2014

(54) POWER CONVERTER HAVING HIGH EFFICIENCY AT LOW LOAD

(75) Inventors: Lien-Hsing Chen, Taichung (TW); Li-Hao Liu, Taichung (TW)

(73) Assignee: Powermate Technology Co., Ltd., Taichung (TW)

( * ) Notice: Subject to any disclaimer, the term of this patent is extended or adjusted under 35 U.S.C. 154(b) by 275 days.

(21) Appl. No.: 13/104,803

(22) Filed: May 10, 2011

(65) Prior Publication Data
US 2012/0236603 A1 Sep. 20, 2012

(30) Foreign Application Priority Data
Mar. 17, 2011 (TW) .............................. 100204776 A (51) Int. Cl.
*H02M 3/335* (2006.01)

(52) U.S. Cl.
USPC ..................................................... 363/21.06

(58) Field of Classification Search
USPC ......... 363/81–94, 125, 127, 20, 21.01, 21.06, 363/95, 97
See application file for complete search history.

(56) References Cited

U.S. PATENT DOCUMENTS

| | | | |
|---|---|---|---|
| 6,351,396 B1 * | 2/2002 | Jacobs | 363/21.06 |
| 7,054,168 B1 * | 5/2006 | Fronk | 363/21.06 |
| 7,443,146 B2 | 10/2008 | Wei et al. | |
| 7,894,214 B1 * | 2/2011 | Chen et al. | 363/21.05 |
| 2005/0024897 A1 * | 2/2005 | Yang et al. | 363/21.06 |
| 2011/0169426 A1 * | 7/2011 | Sadwick et al. | 315/307 |

FOREIGN PATENT DOCUMENTS

TW M374229 2/2010

* cited by examiner

*Primary Examiner* — Adolf Berhane
*Assistant Examiner* — Afework Demisse
(74) *Attorney, Agent, or Firm* — Muncy, Geissler, Olds & Lowe, PLLC (57) ABSTRACT

A power converter includes a DC power source, a transformer having a first winding, a first MOSFET and a PWM controller at the primary side and a second winding, a drive control unit, a current detection control unit, a comparator and a second MOSFET at the secondary side. The comparator has its input end electrically connected to the current detection control unit and its output end electrically connected to the drive control unit, which is electrically connected to the second MOSFET for synchronous rectification. The second MOSFET is electrically connected to one end of the second winding, having a body diode built therein. The second winding and the second MOSFET constitute a combination circuit electrically connected to a load that has a capacitor electrically connected thereto in a parallel manner. By means of the aforesaid arrangement, conduction loss at a low load is minimized, thereby improving the efficiency at a low load.

12 Claims, 7 Drawing Sheets

POWER CONVERTER HAVING HIGH EFFICIENCY AT LOW LOAD

BACKGROUND OF THE INVENTION

1. Field of the Invention

The present invention relates to power conversion technology and more particularly, to a power converter having a relatively higher efficiency at low load.

2. Description of the Related Art

During power conversion of a conventional DC-DC converter, power loss is inevitable. This power loss lowers the conversion efficiency.

However, power density requirement for DC-DC converter is getting critical. The most popularly accepted method to enhance the conversion efficiency of a DC-DC converter is the use of a power MOSFET at the secondary side as a synchronous rectification switch device. This method effectively enhances the efficiency during high load. However, due to increased power loss during driving, this method cannot eliminate no-load power loss, resulting in low efficiency at no-load.

U.S. Pat. No. 7,443,146 discloses a DC-DC converter entitled "Auxiliary turn-on mechanism for reducing conduction loss in body-diode of low side MOSFET of coupled-inductor DC-DC converter". This design has the aforesaid drawback of no-load conduction loss and the drawback of low efficiency at low load.

Taiwan Patent M374229, issued to the present inventor, discloses a technique that reduces no-load conduction loss. However, this design is based on current detection at the primary side of the transformer. It does not involve the technique for making a decision at the secondary side to reduce standby loss without through the primary side. This prior art design is functional to reduce no-load conduction loss, however, there is still room for improvement.

SUMMARY OF THE INVENTION

The present invention has been accomplished under the circumstances in view. It is the main object of the present invention to a power converter, which reduces low-load conduction loss and improves the efficiency at low load.

To achieve this and other objects of the present invention, a power converter comprises a DC power source having a positive terminal and a negative terminal and a transformer having a primary side and a secondary side. The primary side comprises a first winding, a first MOSFET and a PWM controller. The first winding has one end thereof electrically connected to the positive terminal of the DC power source and an opposite end thereof electrically connected to the first MOSFET. The first MOSFET is electrically connected to the PWM controller. The secondary side comprises a second winding, a drive control unit, a current detection control unit, a comparator and a second MOSFET. The current detection control unit is electrically connected to the comparator. The comparator comprises an input end electrically connected to the current detection control unit, and an output end electrically connected to the drive control unit. The drive control unit is electrically connected to the second MOSFET for synchronous rectification. The second MOSFET is electrically connected to one end of the second winding and having built therein a body diode. The second MOSFET is electrically connected with the opposite end thereof to the current detection control unit. The second winding and the second MOSFET form a combination circuit electrically connected to a load that has a capacitor electrically connected thereto in parallel.

By means of the aforesaid arrangement, conduction loss at a low load is minimized, and therefore the invention greatly improves the efficiency at a low load.

DETAILED DESCRIPTION OF THE INVENTION

Figure 1:
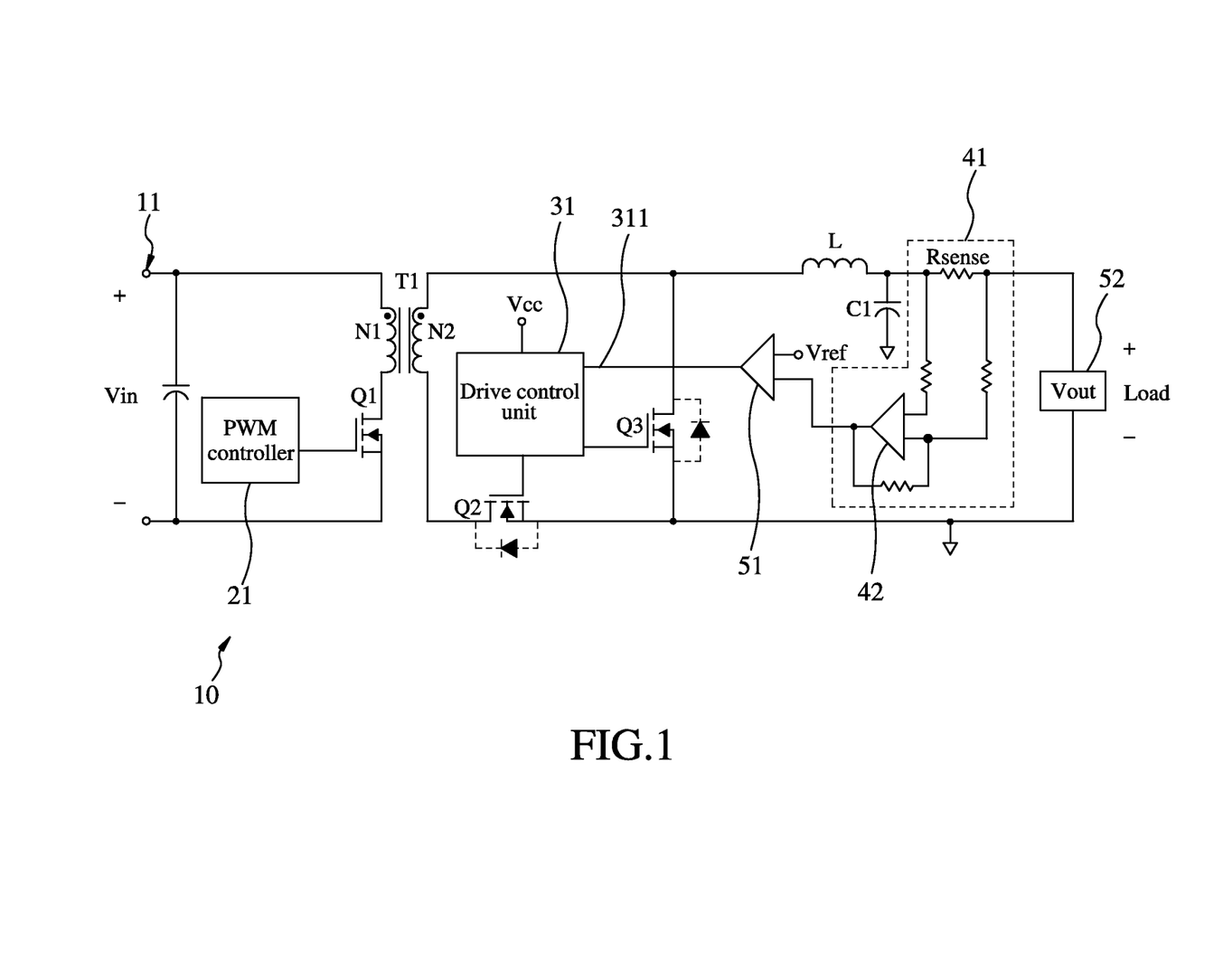
FIG. 1 is a circuit diagram of a power converter in accordance with a first embodiment of the present invention.
Figure 2:
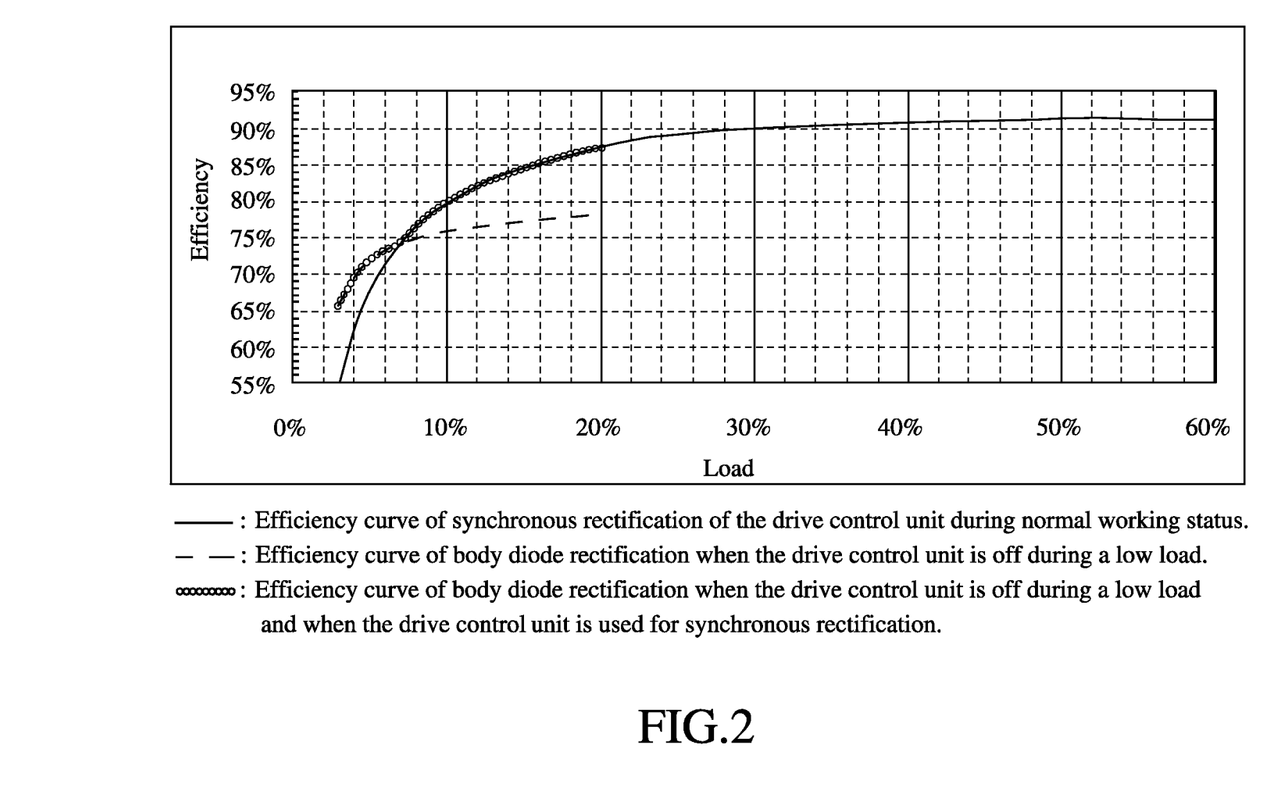
FIG. 2 is an efficiency-load curve obtained from the power converter in accordance with the first embodiment of the present invention.

Referring to FIGS. 1 and 2, a power converter 10 in accordance with a first embodiment of the present invention is shown comprising a DC power source 11, a transformer T1, a first MOSFET (metal-oxide semiconductor field-effect transistor) Q1, a PWM (pulse-width modulation) controller 21, a drive control unit 31, a current detection control unit 41, a comparator 51 and a second MOSFET (metal-oxide semiconductor field-effect transistor) Q2.

The DC power source 11 comprises a positive terminal and a negative terminal.

The transformer T1 comprises a primary side and a secondary side.

The primary side of the transformer T1 comprises a first winding N1 that has its one end connected to the positive terminal of the DC power source 11 and its other end connected to the first MOSFET Q1. The first MOSFET Q1 is electrically connected to the PWM controller 21.

The secondary side of the transformer 21 comprises a second winding N2. The drive control unit 31, the current detection control unit 41, the comparator 51 and the second MOSFET (metal-oxide semiconductor field-effect transistor) Q2 are provided at the secondary side of the transformer 21.

The current detection control unit 41 is electrically connected to one input end of the comparator 51. The comparator 51 has its output end electrically connected to the drive control unit 31. The drive control unit 31 is electrically connected to the second MOSFET Q2, and adapted for providing a synchronous current rectification function. The second MOSFET Q2 is electrically connected to one end of the second winding N2, having a body diode built therein. The second winding N2 has its other end electrically connected to the current detection control unit 41.

The combination circuit of the first winding N1 and the second MOSFET Q2 is electrically connected to a load 52 that has a capacitor C1 connected thereto in a parallel manner.

In this embodiment, the terminal end of the first winding N1 is electrically connected to the positive terminal of the DC power source 11; the terminal end of the second winding N2 is electrically connected to the current detection control unit

41. The drive control unit 31 is a synchronous rectifier controller, having a disable pin 311. The output end of the comparator 51 is electrically connected to the disable pin 311. Further, the current detection control unit 41 comprises an amplifier 42 and a sensing resistor Rsense. The sensing resistor Rsense has its two opposite ends respectively electrically connected to the terminal end of the second winding N2 and the load 52.

This embodiment further comprises a third MOSFET Q3, an inductor L and a sensing resistor Rsense. The third MOSFET Q3 has its source, gate and drain respectively electrically connected to the second MOSFET Q2, the drive control unit 31 and the terminal end of the second winding N2. The inductor L has its two opposite ends respectively electrically connected to the terminal end of the second winding N2 and the current detection control unit 41.

The operation of this first embodiment will be outlined hereinafter.

By means of the PWM controller 21 to control conduction of the first MOSFET Q1, power supply from the primary side is transformed to the secondary side.

During the normal operation (or high load mode), the current at the load 52 is detected by the sensing resistor Rsense converted into a voltage signal that is provided to the amplifier 42 for amplification. After amplification, the amplifier 42 outputs the amplified signal to the comparator 51 for comparing to a predetermined reference voltage Vref. After comparison, the comparator 51 outputs a signal through its output end to the disable pin 311 of the drive control unit 31. At this time, the output voltage to the disable pin 311 is a normal voltage, and therefore the drive control unit 31 continuously outputs pulses to conduct the second MOSFET Q2, keeping normal working.

When entered a low load mode, the current at the load 52 drops and the output voltage of the amplifier 42 also drops. When the voltage drops below the reference voltage of the comparator 51, the signal outputted by the comparator 51 to the disable pin 311 becomes a low voltage, and therefore the drive control unit 31 is off. When the drive control unit 31 is off, the second MOSFET Q2 and the third MOSFET Q3 are turned off, enabling the body diode of the second MOSFET Q2 and the body diode of the third MOSFET Q3 to rectify the current.

Thus, when at a low load, the second side utilizes the body diode of the second MOSFET Q2 and the body diode of the third MOSFET Q3 to rectify the current, lowering power loss, and therefore the power loss at a low load is minimized to improve the low-load working efficiency.

The timing to turn off the second MOSFET Q2 and the third MOSFET Q3 can be adjusted subject to the efficiency-load curve at low load, as shown in FIG. 2. As illustrated, the action point of the comparator 51 (the timing point where the output voltage of the current detection control unit 41 is greater or smaller than the reference voltage Vref) can be set at the cross point in the efficiency-load curve when the drive control unit 31 starts synchronous rectification and when the drive control unit 31 is turned off to let the body diode thereof rectify the current, enabling the efficiency-load curve to make up the defects and to optimize the efficiency of the power converter at different load status.

As stated above, in the aforesaid first embodiment, off control of the drive control unit 31 is determined by means of the comparator 51 at the secondary side, more particularly by means of the secondary side of the transformer T1.

Figure 3:
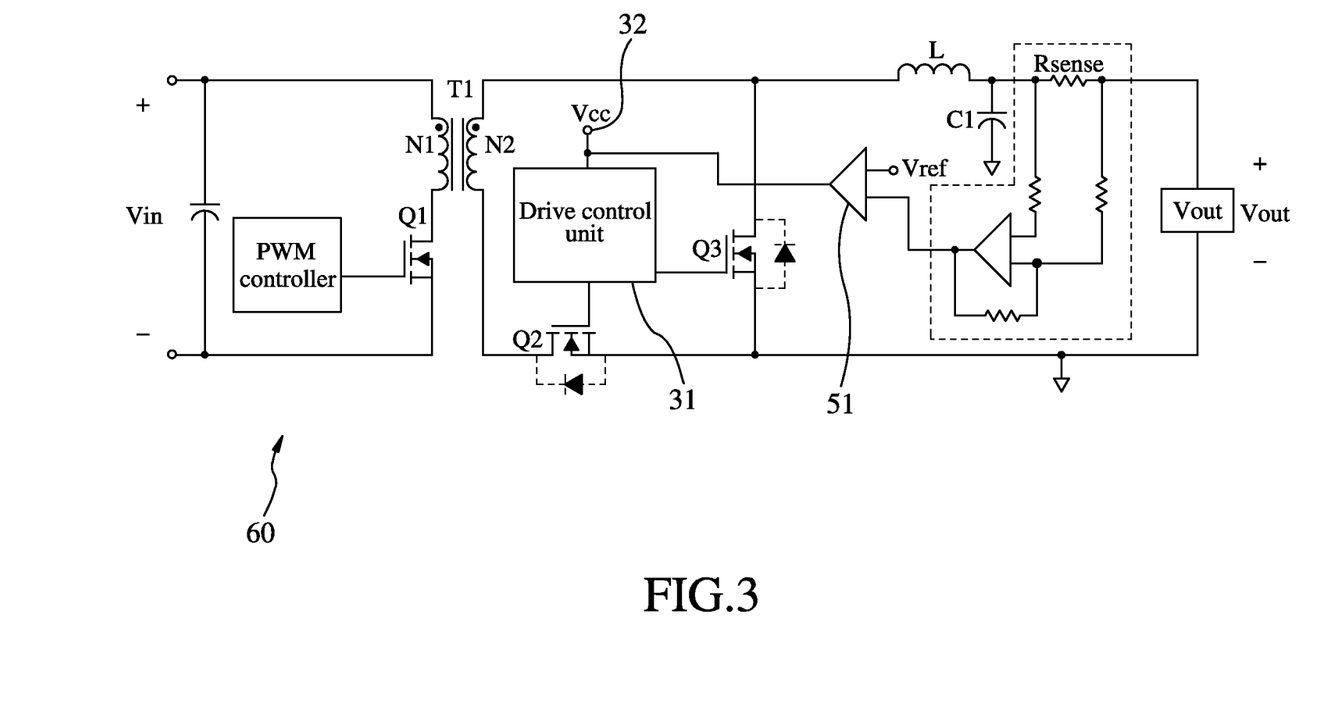
FIG. 3 is a circuit diagram of a power converter in accordance with a second embodiment of the present invention.

FIG. 3 illustrates a power converter 60 in accordance with a second embodiment of the present invention. This second embodiment is substantially similar to the aforesaid first embodiment with the exception of the following features.

The drive control unit 31 is a synchronous rectifier controller having a power end 32. The output end of the comparator 51 is electrically connected to the power end 32 of the drive control unit 31.

When the output end of the comparator 51 outputs a low voltage signal during operation, the power end 32 directly turns off the drive control unit 31, achieving the same effect to turn off the second MOSFET Q2 and the third MOSFET Q3.

The other structural features, operation method and effects of this second embodiment are same as the aforesaid first embodiment, and therefore no further detailed description in necessary.

Figure 4:
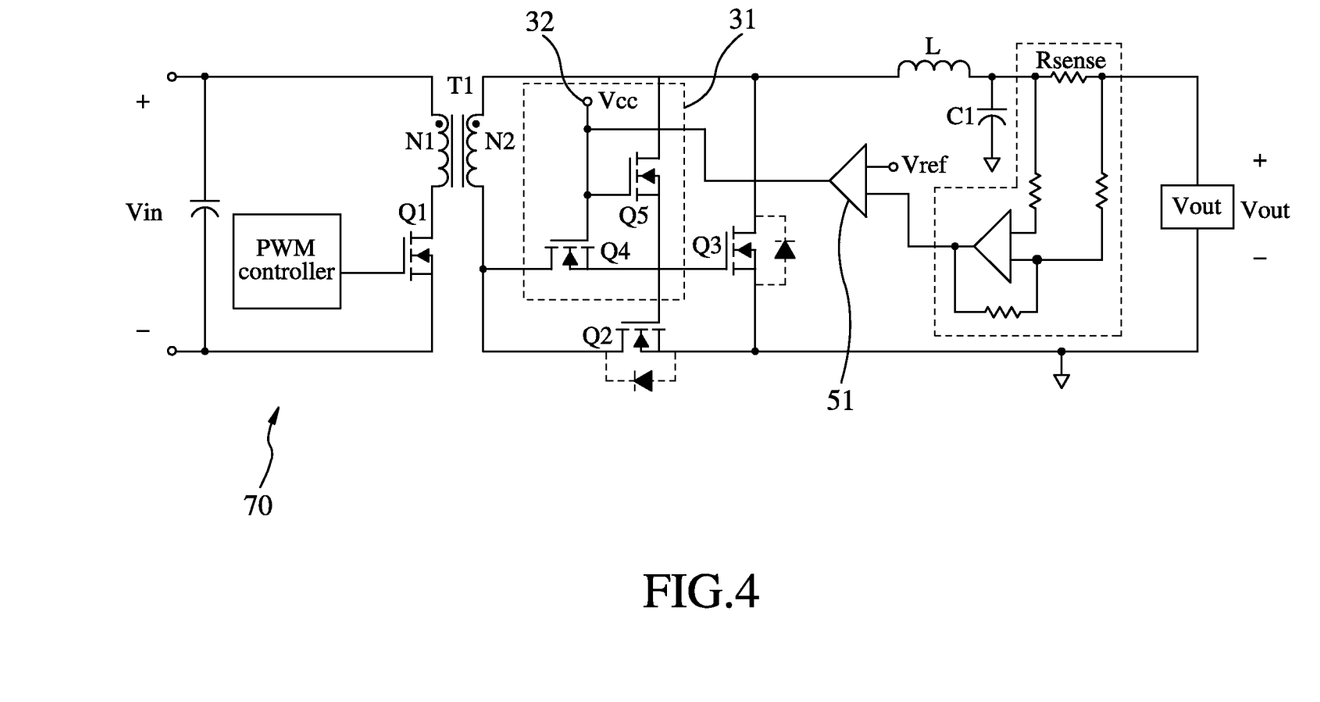
FIG. 4 is a circuit diagram of a power converter in accordance with a third embodiment of the present invention.

FIG. 4 illustrates a power converter 70 in accordance with a third embodiment of the present invention. This third embodiment is substantially similar to the aforesaid first embodiment with the exception of the following features.

The drive control unit 31 comprises two MOSFETs Q4,Q5 and a power end 32. The output end of the comparator 51 is electrically connected to the power end 32 of the drive control unit 31. The gates of the two MOSFETs Q4,Q5 are electrically connected to the power end 32.

When the output end of the comparator 51 outputs a low voltage signal during operation, the power end 32 directly turns off the two MOSFETs Q4,Q5, achieving the same effect to turn off the second MOSFET Q2 and the third MOSFET Q3.

The other structural features, operation method and effects of this third embodiment are same as the aforesaid first embodiment, and therefore no further detailed description in necessary.

Figure 5:
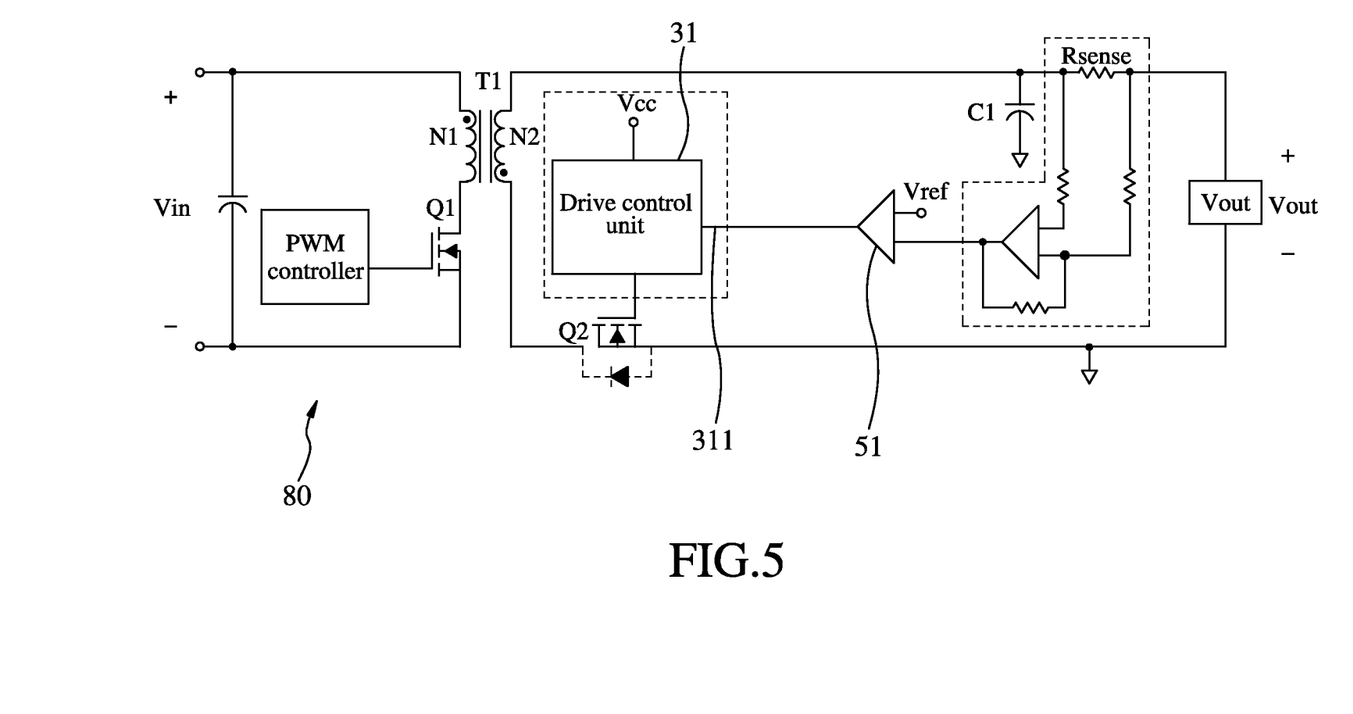
FIG. 5 is a circuit diagram of a power converter in accordance with a fourth embodiment of the present invention.

FIG. 5 illustrates a power converter 80 in accordance with a fourth embodiment of the present invention. This fourth embodiment is substantially similar to the aforesaid first embodiment with the exception of the following features.

This fourth embodiment eliminates the aforesaid third MOSFET Q3 and the aforesaid inductor L but uses the second MOSFET Q2 to match with the transformer T1 and the capacitor C1, forming a flyback converter.

When the output end of the comparator 51 outputs a low voltage signal during operation, it goes through the disable pin 311 to turn off the drive control unit 31 and to further turn off the second MOSFET Q2, enabling the body diode of the second MOSFET Q2 to rectify the current.

The other structural features, operation method and effects of this fourth embodiment are same as the aforesaid first embodiment, and therefore no further detailed description in necessary.

Figure 6:
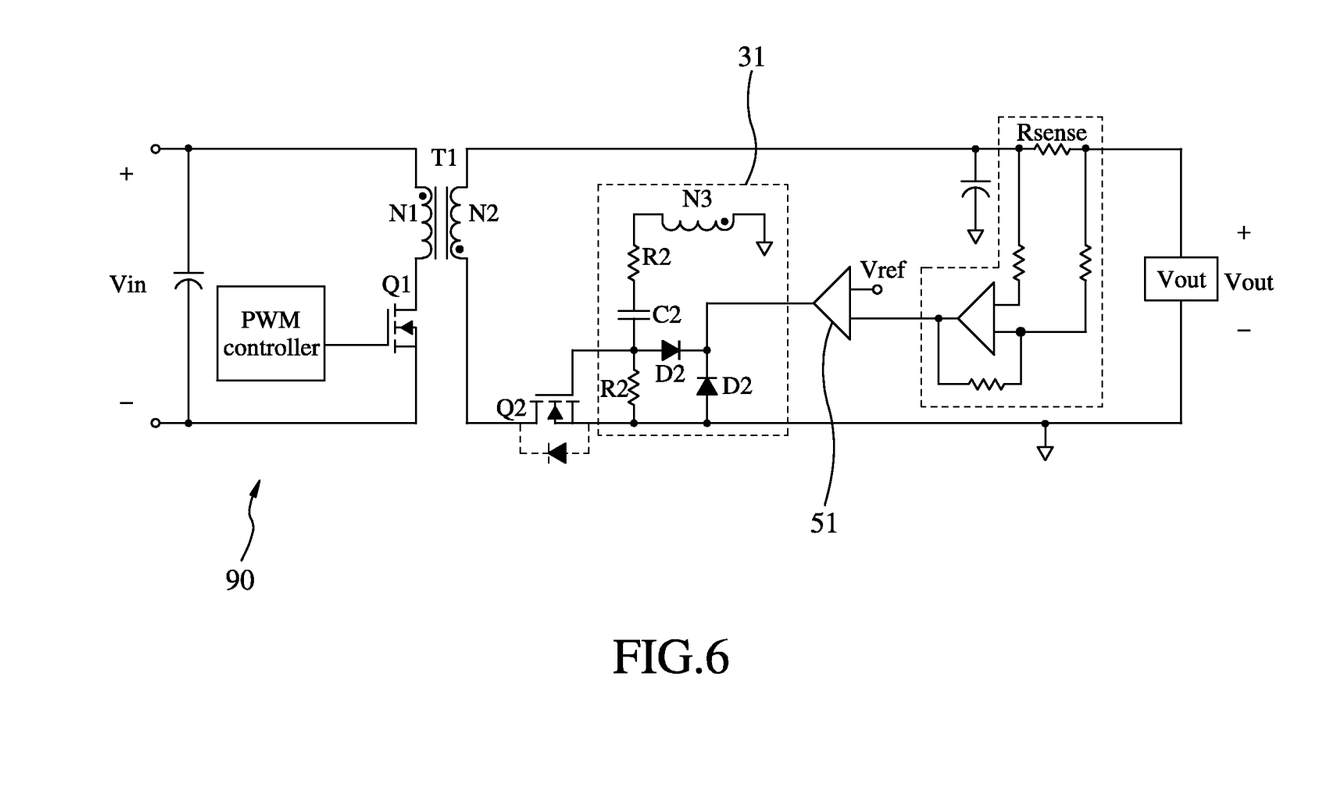
FIG. 6 is a circuit diagram of a power converter in accordance with a fifth embodiment of the present invention.

FIG. 6 illustrates a power converter 90 in accordance with a fifth embodiment of the present invention. This fifth embodiment is substantially similar to the aforesaid fourth embodiment with the exception of the following features.

This fifth embodiment further comprises a third winding N3. The drive control unit 31 consists of the third winding N3, two diodes D2, two resistors R2 and one capacitor C2. The terminal end of the third winding N3 is electrically connected to the second MOSFET Q2.

When the output end of the comparator 51 outputs a low voltage signal during operation, it goes through the drive control unit 31 to turn off the second MOSFET Q2, enabling the body diode of the second MOSFET Q2 to rectify the current.

The other structural features, operation method and effects of this fifth embodiment are same as the aforesaid fourth embodiment, and therefore no further detailed description in necessary.

Figure 7:
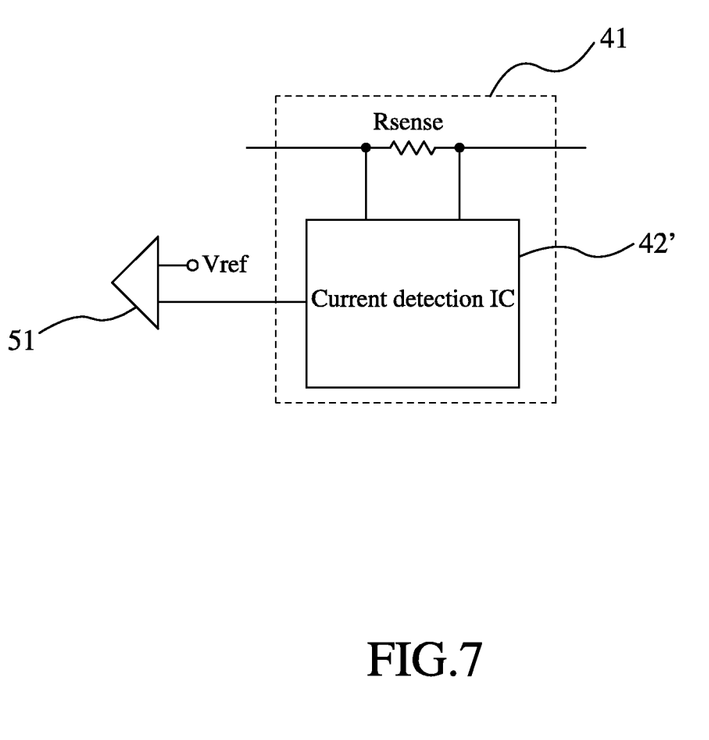
FIG. 7 is an equivalent circuit diagram illustrating the circuit architecture of an alternate form of the current detection control unit in accordance with the present invention.

Further, it is to be understood that the amplifier of the drive control unit 41 can be replaced by a current sensing IC 42', as shown in FIG. 7, i.e., the use of the comparator 42 for the drive control unit 41 is not a limitation.

As stated above, the invention achieves the effects as follows: When at a low load, the decision to turn off the drive control unit 31 is made by means of the comparator 51 at the secondary side, i.e., at the secondary side of the transformer T1.

Further, the body diode of each MOSFET at the secondary side is used to rectify the current, lowering power loss, and therefore low-load conduction loss is minimized to improve low-load efficiency.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A power converter, comprising:
   a DC power source comprising a positive terminal and a negative terminal; and
   a transformer comprising a primary side and a secondary side; wherein:
   said primary side comprises a first winding, a first MOSFET and a PWM controller, said first winding having one end thereof electrically connected to the positive terminal of said DC power source and an opposite end thereof electrically connected to said first MOSFET, said first MOSFET being electrically connected to said PWM controller;
   said secondary side comprises a second winding, a drive control unit, a current detection control unit, a comparator and a second MOSFET, said current detection control unit being electrically connected to said comparator, said comparator comprising an input end electrically connected to said current detection control unit and an output end electrically connected to said drive control unit, said drive control unit being electrically connected to said second MOSFET for synchronous rectification, said second MOSFET being electrically connected to one end of said second winding and comprising therein a body diode, said second MOSFET being electrically connected with an opposite end thereof to said current detection control unit, said second winding and said second MOSFET forming a combination circuit electrically connected to a load having a capacitor electrically connected thereto in parallel,
   wherein said current detection control unit comprises a sensing resistor, said sensing resistor having two opposite ends electrically connected to a terminal end of said second winding and the load, respectively.

2. The power converter as claimed in claim 1, wherein said first winding has the terminal end thereof electrically connected to the positive terminal of said DC power source; said second winding has the terminal end thereof electrically connected to said current detection control unit.

3. The power converter as claimed in claim 2, further comprising a third MOSFET electrically connected to said second MOSFET, said drive control unit and the terminal end of said second winding, and an inductor having two opposite ends thereof respectively electrically connected to the terminal end of said second winding and said current detection control unit.

4. The power converter as claimed in claim 3, wherein said drive control unit is a synchronous rectifier controller comprising a disable pin; the output end of said comparator is electrically connected to said disable pin of said drive control unit.

5. The power converter as claimed in claim 3, wherein said drive control unit is a synchronous rectifier controller comprising a power end; the output end of said comparator is electrically connected to said power end of said drive control unit.

6. The power converter as claimed in claim 3, wherein said drive control unit comprises two MOSFETs and a power end, the gate of each of the two MOSFETs of said drive control unit being electrically connected to said power end of said drive control unit; the output end of said comparator is electrically connected to said power end of said drive control unit.

7. The power converter as claimed in claim 3, wherein said current detection control unit comprises an amplifier.

8. The power converter as claimed in claim 3, wherein said current detection control unit comprises a current sensing IC.

9. The power converter as claimed in claim 2, wherein said drive control unit is a synchronous rectifier controller comprising a disable pin; the output end of said comparator is electrically connected to the disable pin of said drive control unit.

10. The power converter as claimed in claim 2, further comprising a third winding, wherein said drive control unit consists of said third winding, two diodes, two resistors and one capacitor.

11. The power converter as claimed in claim 2, wherein said current detection control unit comprises an amplifier.

12. The power converter as claimed in claim 2, wherein said current detection control unit comprises a current sensing IC.

* * * * *